(12) United States Patent
Nesbitt et al.

(10) Patent No.: US 6,718,752 B2
(45) Date of Patent: Apr. 13, 2004

(54) DEPLOYABLE SEGMENTED EXHAUST NOZZLE FOR A JET ENGINE

(75) Inventors: Eric H. Nesbitt, Duvall, WA (US); George W. Butler, Seattle, WA (US); David H. Reed, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/157,681

(22) Filed: May 29, 2002

(65) Prior Publication Data

US 2003/0221411 A1 Dec. 4, 2003

(51) Int. Cl.⁷ .............................. F02K 1/10; F02K 1/06
(52) U.S. Cl. ............................. 60/204; 60/264; 60/262; 181/220; 239/265.19
(58) Field of Search ...................... 60/204, 262, 264; 181/213, 220; 239/265.19

(56) References Cited

U.S. PATENT DOCUMENTS

| 5,771,681 | A | | 6/1998 | Rudolph | |
| 6,015,263 | A | * | 1/2000 | Morris | 416/132 A |
| 6,314,721 | B1 | | 11/2001 | Mathews et al. | |
| 6,318,070 | B1 | * | 11/2001 | Rey et al. | 60/226.3 |
| 6,487,848 | B2 | | 12/2002 | Zysman et al. | |
| 6,532,729 | B2 | | 3/2003 | Martens | |
| 2002/0125340 | A1 | * | 9/2002 | Birch et al. | 239/265.11 |

FOREIGN PATENT DOCUMENTS

GB        2289921 A        6/1995

* cited by examiner

*Primary Examiner*—Ted Kim
(74) *Attorney, Agent, or Firm*—Harness Dickey & Pierce P.L.C.

(57) ABSTRACT

An exhaust flow nozzle for a jet engine having a plurality of flow altering components extending from a lip portion of a secondary exhaust nozzle that are movable between first and second positions. In the first position the flow altering components are disposed substantially parallel to an exhaust gas flow path and thereby do not produce drag or a reduction of thrust from the engine. In the second position the flow altering components bend or are deformed to project into the exhaust gas flow path exiting from the secondary exhaust nozzle. The flow altering components are comprised of a shape-memory alloy material which deforms in response to heat. One or more additional layers of material are bonded or otherwise coupled to the shape-memory alloy layer of each flow altering component to assist in returning the shape-memory alloy layer to its unheated shape.

19 Claims, 4 Drawing Sheets

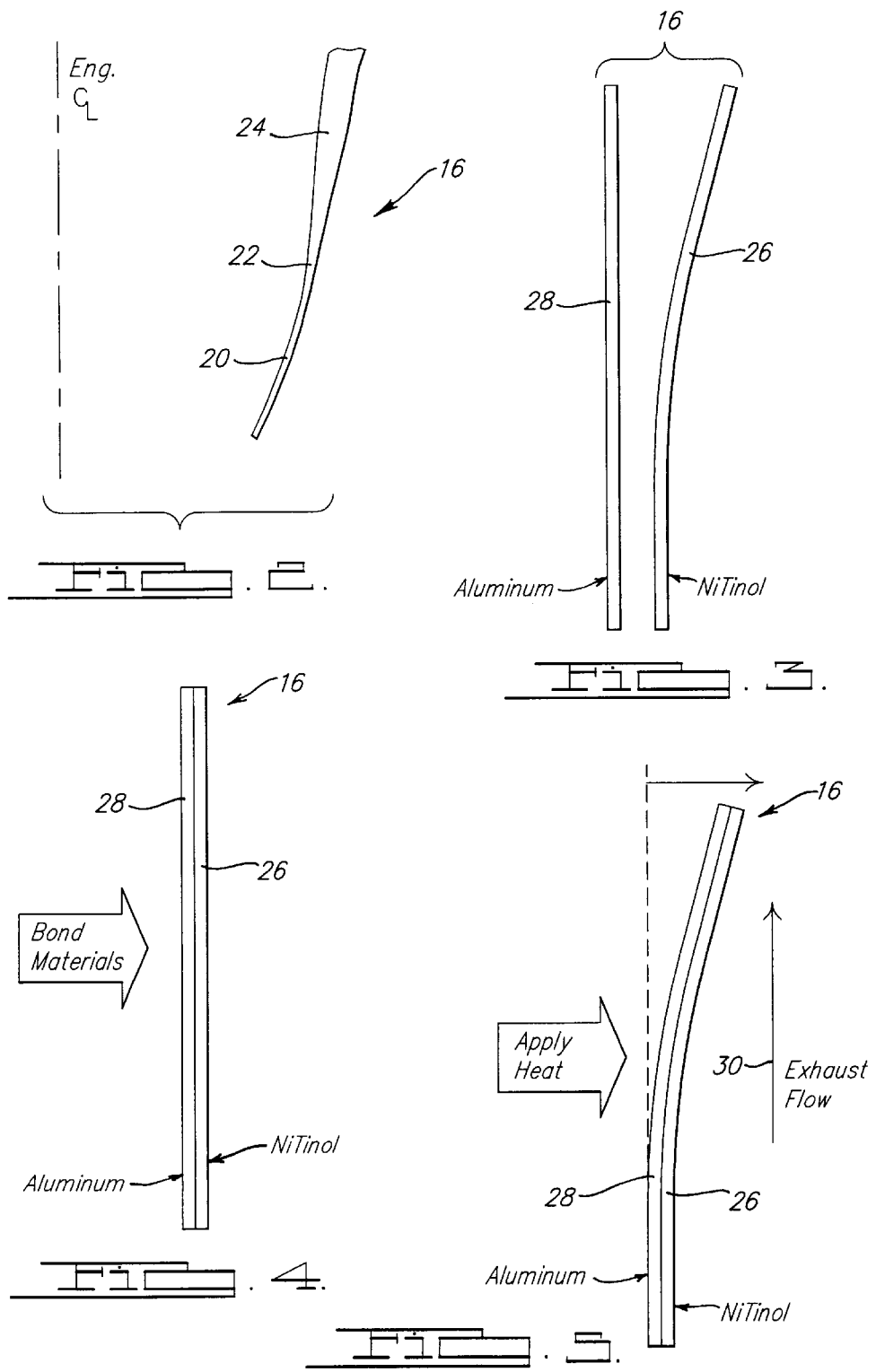

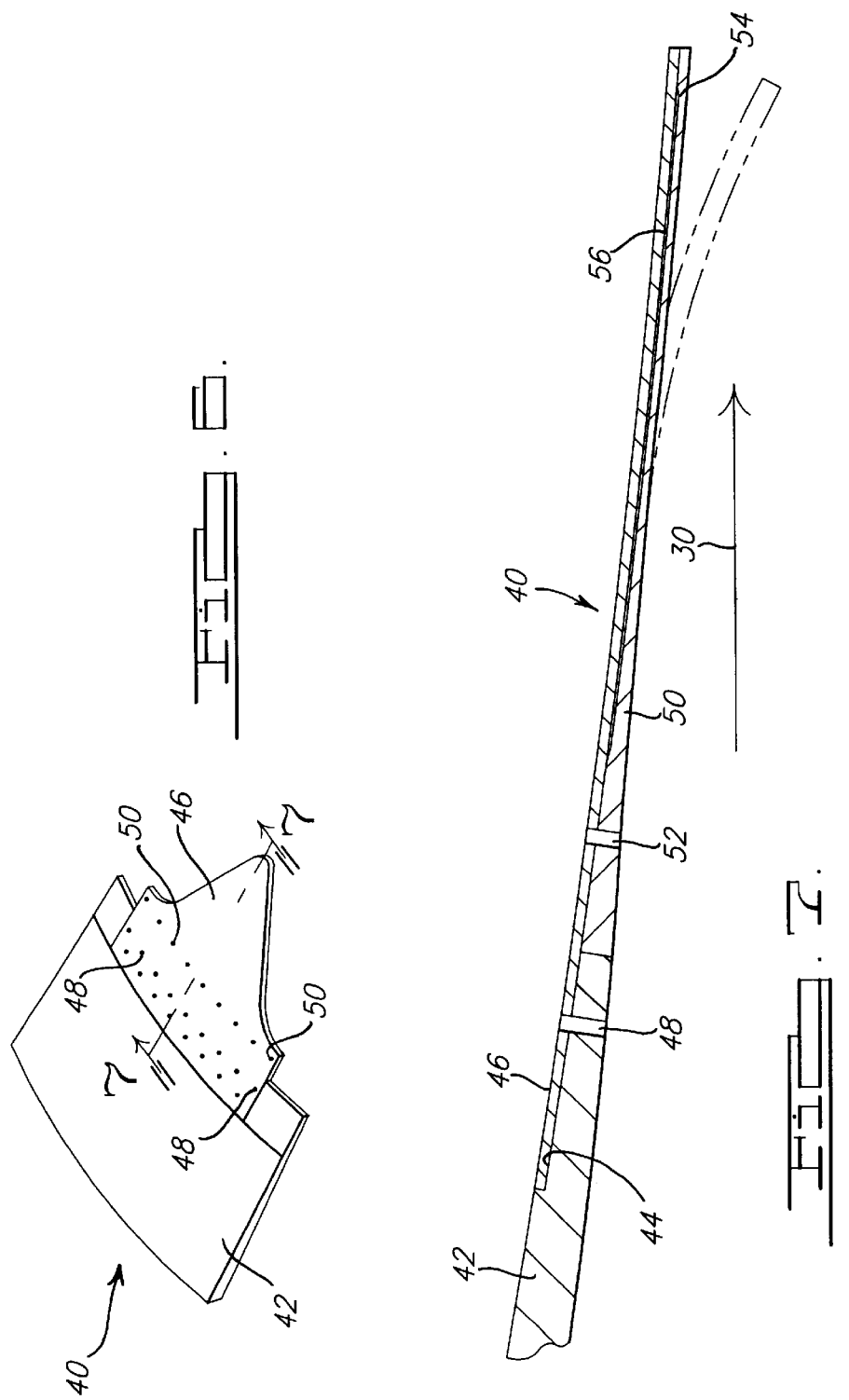

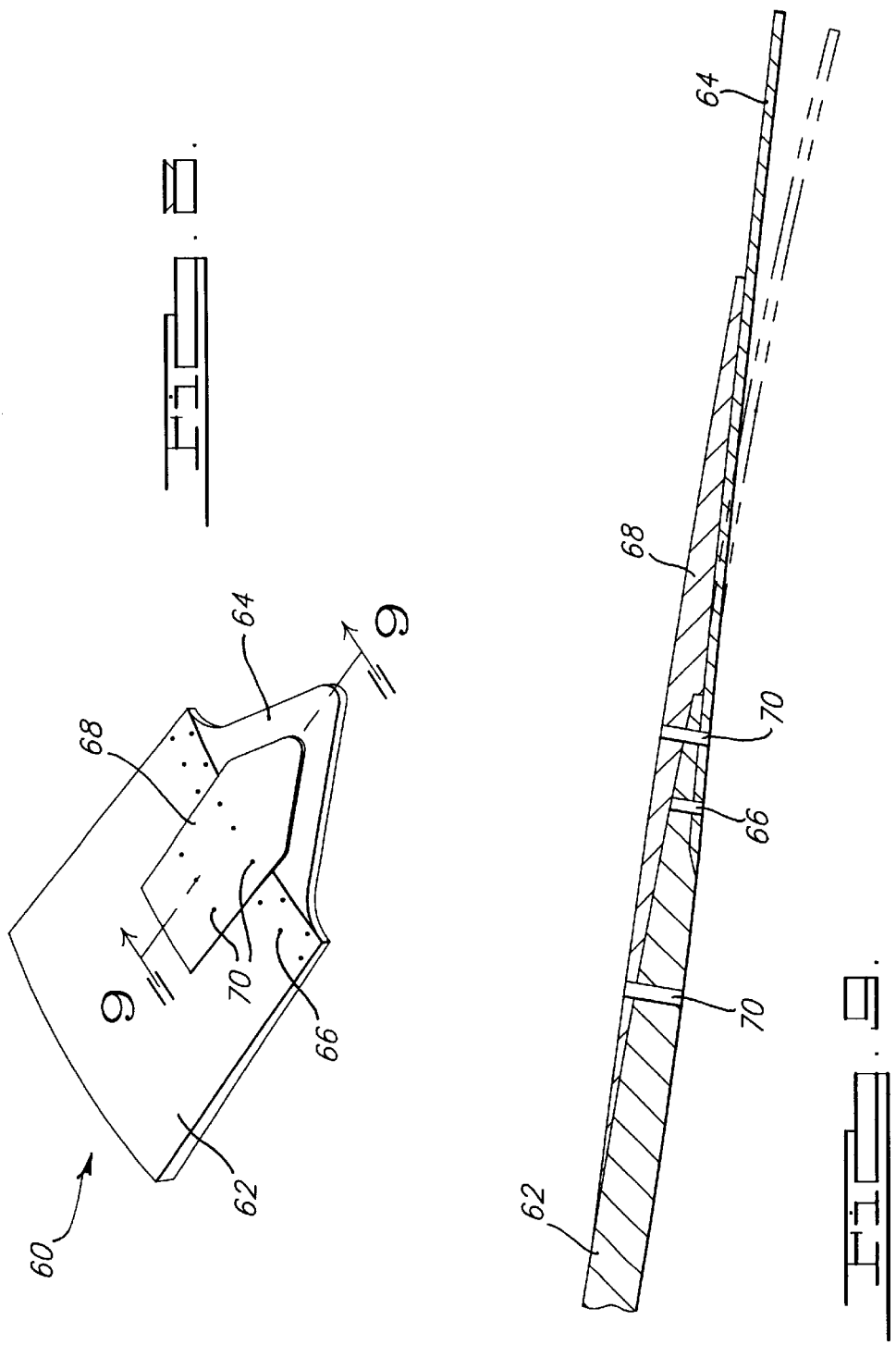

DEPLOYABLE SEGMENTED EXHAUST NOZZLE FOR A JET ENGINE

FIELD OF THE INVENTION

This invention relates to noise suppression devices used with jet engines, and more particularly to a deployable, segmented exhaust nozzle for attenuating the noise produced by a jet engine.

BACKGROUND OF THE INVENTION

With present day jet aircraft, structure typically known in the industry as "chevrons" have been used to help in suppressing noise generated by a jet engine. The chevrons have traditionally been fixed (i.e., immovable), triangular, tab-like elements disposed along a trailing edge of a secondary exhaust nozzle of the jet engine such that they project into the exhaust gas flow stream exiting from the secondary exhaust nozzle. The chevrons have proven to be effective in reducing the broadband noise generated by the mixing of primary-secondary and secondary/ambient exhaust streams for a wide range of operating conditions. Since the chevrons interact directly with the exhaust flow, however, they also generate drag and loss of thrust. Consequently, there is a tradeoff between the need to attenuate noise while still minimizing the loss of thrust due to the presence of the chevrons.

Noise reduction is typically needed for takeoff of an aircraft but not during cruise. Thus, any noise reduction system/device that reduces noise at takeoff (i.e., a high thrust condition) ideally should not significantly degrade the fuel burn during cruise. A compromise therefore exists between the design of static (i.e. immovable) chevrons for noise abatement and the need for low cost operation during cruise.

Thus, there exists a need for a noise reduction system which provides the needed noise attenuation at takeoff but does not produce drag and a loss of thrust during cruise conditions. More specifically, there is a need for a noise reduction system which permits a plurality of chevrons to be used in connection with an exhaust nozzle of a jet engine to attenuate noise during takeoff, but which also permits the chevrons to be moved out of the exhaust gas flow path of the engine during cruise conditions to prevent drag and a consequent loss of thrust during cruise conditions.

SUMMARY OF THE INVENTION

The above limitations are overcome by a noise reduction system in accordance with preferred embodiments of the present invention. In one preferred form the noise reduction system comprises a plurality of exhaust flow altering components spaced apart from one another and extending from a lip of an exhaust nozzle of a jet engine adjacent a flow path of an exhaust flow emitted from the exhaust nozzle. Each of the exhaust flow altering components are constructed to be controllably deformable from a first position adjacent the flow path to a second position extending into the flow path of the exhaust flow in response to a control signal applied to each of the flow altering components. In the first position, the flow altering components either have no affect on the thrust produced, or increase the momentum (thrust) of the exhaust flow exiting from the exhaust nozzle. In the second position, that is, the "deployed" position, the flow altering components are deformed to extend into the flow path. In this position the flow altering components promote mixing of the exhaust flow with an adjacent air flow. This results in the attenuation of noise generated by the jet engine.

In one preferred form each of the flow altering components comprises a heat sensitive layer of prestressed, shape-memory material which responds to the exhaust flow (i.e., the control signal) by deforming such that it bends to project into the exhaust flow path when in the second position. In one preferred embodiment the shape-memory material comprises an alloy of nickel and titanium.

In another preferred embodiment a conductor is included in the flow altering component which allows an electrical current (i.e., the control signal) to be flowed through the flow altering component. The electrical current generates the heat needed to deform the flow altering component so that it can be moved into the second position.

In the above described embodiments, a second piece of material also is disposed adjacent the layer of prestressed, shape-memory material to act as a return "spring". The second layer of material assists in returning the shape-memory material into the first position when the control signal is removed therefrom.

In the above-described embodiment which relies on the heat generated by the exhaust gas flow, the level of heat experienced during takeoff is sufficient to effect the deformation, and thus the deployment, of the flow altering components. As the aircraft reaches a cruise altitude, the significant cooling experienced by the flow altering components allows the flow altering components to be returned to their non-deformed (and thus non-deployed) orientations coinciding with the first position described above.

Further areas of applicability of the present invention will become apparent from the detailed description provided hereinafter. It should be understood that the detailed description and specific examples, while indicating the preferred embodiments of the invention, are intended for purposes of illustration only and are not intended to limited the scope of the invention.

BRIEF DESCRIPTION OF THE DRAWINGS

The present invention will become more fully understood from the detailed description and the accompanying drawings, wherein:

FIG. 2 is a partial side view of one of the flow altering components taken in accordance with section line 2—2 in FIG. 1;

FIG. 3 is a simplified side view of the two layers of material used to form the flow altering component, in one preferred form;

FIG. 4 is a simplified side view of the two materials of FIG. 3 after having been bonded together;

FIG. 5 is a simplified side view of a portion of the flow altering component illustrating the deformation produced in response to heat experienced by the shape-memory alloy layer of the flow altering component;

FIG. 6 is a view of an alternative preferred embodiment of one of the flow altering components of the present invention;

FIG. 7 is a cross sectional side view of the flow altering component of FIG. 6 taken in accordance with section line 7—7 in FIG. 6;

FIG. 8 is another alternative preferred form of the flow altering component of the present invention; and FIG. 9 is a cross sectional side view of the flow altering component of FIG. 8 taken in accordance with section line 9—9 in FIG. 8.

DETAILED DESCRIPTION OF THE PREFERRED EMBODIMENTS

Figure 1:
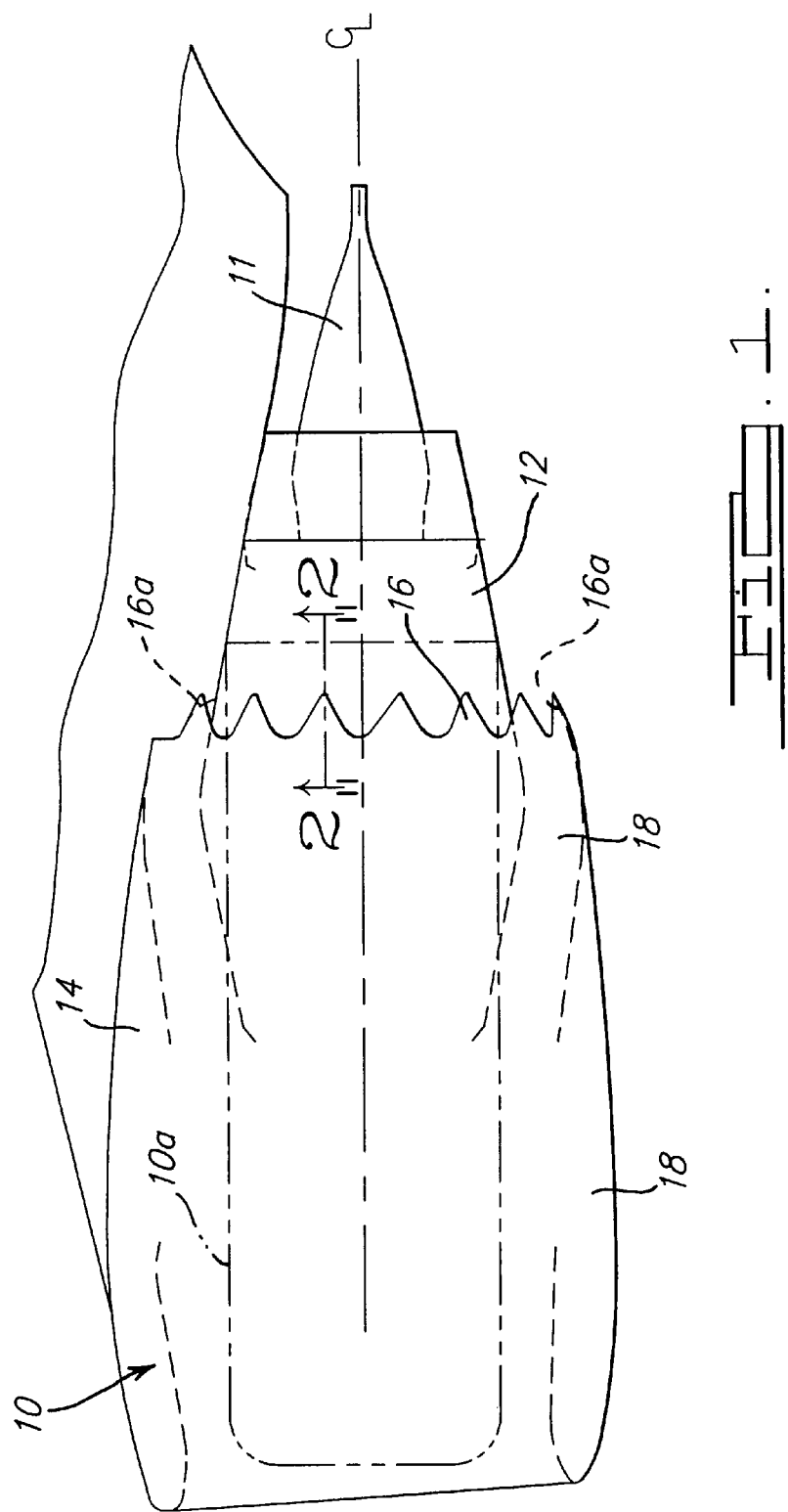
FIG. 1 is a simplified side view of a nacelle for housing a jet engine of an aircraft, with the nacelle incorporating the flow altering components of the present invention along a trailing circumferential lip portion of the secondary exhaust nozzle of the nacelle.

The following description of the preferred embodiment(s) is merely exemplary in nature and is in no way intended to limit the invention, its application, or uses.

Referring to FIG. 1, there is shown an engine nacelle 10 for housing a jet engine 10a. The nacelle 10 includes a primary exhaust gas flow nozzle 12 and a secondary exhaust gas flow nozzle 14. A plug 11 is disposed within the nacelle 10. The secondary exhaust flow nozzle 14 includes a plurality of flow altering components 16 in accordance with a preferred embodiment of the present invention. The flow altering components 16 extend from a lip area 18 of the secondary flow nozzle 14. As will be described in greater detail in the following paragraphs, each of the flow altering components 16 operates to deform (i.e., bend or deflect) in response to heat such that they extend (i.e., "deploy") partially into the exhaust gas flow path exiting from the secondary exhaust gas flow nozzle 14. This is indicated by dashed lines 16a on the uppermost and lowermost flow altering components 16 in the drawing of FIG. 1. The flow altering components 16 are preferably arranged circumferentially around the entire lip portion 18 of the secondary exhaust gas flow nozzle 14.

Referring to FIG. 2, a portion of one of the flow altering components 16 is illustrated. It will be appreciated that in the industry the flow altering components 16 are often referred to as "chevrons". However, it should be appreciated that while the term "chevron" implies a triangular shape, the flow altering components 16 are not limited to a triangular configuration but may comprise other shapes such as, but not limited to, rectangles, trapezoids, or portions of circles. The flow altering components 16 each include a tab portion 20, a root portion 22 and a nozzle extension portion 24. The nozzle extension portion is used to secure the flow altering component 16 to the lip portion 18 of the secondary exhaust flow nozzle 14. The tab portion 20 is the principal portion that projects into the exhaust gas flow path discharged from the secondary exhaust gas flow nozzle 14. The lip area 22 forms an intermediate area for transitioning from the tab portion 20 to the nozzle extension portion 24. The nozzle extension portion 24 can be secured with rivets or any other suitable securing means to the lip portion 18 of the secondary exhaust gas flow nozzle 14.

Referring now to FIG. 3, the flow altering component 16 is formed by a layer of heat sensitive, prestressed shape-memory alloy material 26 which is bonded or otherwise suitably secured to a layer of metal such as, for example, aluminum 28. In one preferred form the shape-memory alloy 26 comprises a nickel-titanium alloy. More preferably, NITINOL® shape-memory, nickel-titanium alloy is used for the shape-memory alloy layer 26. It is important to note that the shape-memory alloy 26 is formed so as to be prestressed with a desired degree of curvature illustrated in FIG. 3. This is the curvature that the shape-memory alloy layer 26 will assume when it is heated by the exhaust gas flow emitted from the secondary exhaust gas flow nozzle 14 and deforms into its deployed position. The curvature needs to be sufficient to allow the layer 26 to project into the exhaust gas flow path once it is heated.

The overall thickness of the layer 26 at the tab portion 20 may vary, but in one preferred from it is preferably between about 0.05"–0.25" (1.27 mm–6.35 mm), and more preferably about 0.15" (3.81 mm). At the root portion 22 the overall thickness is preferably between about 0.15"–0.35" (3.81 mm–8.89 mm), and more preferably about 0.25" (6.35 mm). The thickness of the shape memory alloy layer 26 is preferably between about 0.15"–0.20" (3.81 mm–5.08 mm). It will be appreciated that all of the above-mentioned dimensional ranges could be varied further to suit the needs of a specific application.

Referring to FIG. 4, the shape-memory alloy layer 26 assumes a generally preset shape once secured to the metal layer 28. This is because when the shape-memory alloy layer 26 is not being heated, the strength of the metal layer 28 is greater than that of the shape-memory alloy 26, thus causing the shape-memory alloy layer 26 to be straightened into the position shown in FIG. 4. This may also be referred to as the "martensitic" shape of the shape-memory alloy layer 26 (i.e., its "cold" shape).

When the shape-memory alloy layer 26 experiences heat, indicated by exhaust gas flow arrow 30, the modulus of elasticity of the shape-memory alloy 26 increases significantly, thus causing the layer 26 to bend or deform into the exhaust gas flow 30. If NITINOL® shape-memory nickel-titanium alloy is used as the shape-memory alloy layer 26, its modulus of elasticity will increase by a factor of about three when it is in its "hot" state (i.e., also known as its "austenitic" state). In its heated condition, the modulus of elasticity of the shape-memory alloy layer 26 overcomes the modulus of elasticity of the metal layer 28, thus causing the deformation shown in FIG. 5. Once the heat source is removed, the metal layer 28 gradually overcomes the modulus of elasticity of the shape-memory alloy layer 26 as layer 26 cools, thus effectively "pulling" the shape-memory alloy layer 26 back into the position shown in FIG. 4.

In actual operation, the heat provided by the exhaust gases emitted from the secondary exhaust gas flow nozzle 14 is typically sufficient in temperature (approximately 130 degrees Fahrenheit) to produce the needed deformation of the shape-memory alloy layer 26. The actual degree of deformation may vary considerably depending upon the specific type of shape memory alloy used, as well as its thickness, but the preferred embodiments described herein deflect between about 0.5"–1.0" (12.7 mm–25.4 mm) when activated.

When the aircraft reaches its cruising altitude, the significant drop in ambient temperature effectively acts to cool the shape-memory alloy layer 26, thus allowing the metal layer 28 to gradually return the shape-memory alloy layer 26 to the position shown in FIG. 4. When in the position shown in FIG. 5, each of the flow altering components 16 is deployed, and thus protruding into the exhaust gas flow path 30, thus causing intermixing of the exhaust gas with the ambient air flowing adjacent the secondary exhaust gas flow nozzle 14. This intermixing produces a tangible degree of noise reduction. Most advantageously, as the aircraft reaches its cruise altitude, the retraction of the flow altering components 16 to the orientation shown in FIG. 4 prevents the drag and loss of thrust that would otherwise be present if the flow altering components 16 each remained in a deformed (i.e., deployed) condition.

Referring now to FIG. 6, a flow altering component 40 in accordance with an alternative preferred embodiment of the present invention is shown. It will be appreciated that a plurality of flow altering components 40 are secured to the lip portion 18 of the secondary flow nozzle 14 so as to be spaced circumferentially about the secondary flow nozzle 14, just as described in connection with flow altering components 16. Each flow altering component 40 includes a layer of composite material 42 having a recessed area 44 upon which is secured a shape-memory alloy layer 46. The layers 44 and 46 are secured together via double countersunk ASP fasteners 48 inserted within appropriately formed holes in each of the layers 42 and 46. Layer 46 may comprise NITINOL® shape-memory nickel-titanium alloy. A layer 50 of super-elastic nickel-titanium alloy, preferably NITINOL® shape-memory nickel-titanium alloy 60", is also secured to the shape-memory alloy layer 46 by a plurality of double flush rivets 52 joining layers 46 and 50. It will be appreciated immediately, however, that other forms of attachment could be employed, such as adhesives. The super-elastic alloy layer 50 is also relieved at area 52 to provide clearance for a conductor 54 which is sandwiched between the super-elastic alloy layer 50 and the shape-memory alloy layer 46. The conductor 54 may comprise an electrical conductor which is coupled to a suitable source of electrical current (not shown). The conductor 54 operates to provide heat to the shape-memory alloy layer 46 to thereby cause the deformation of the flow altering component 40 into the deployed position indicated in dashed lines relative to the exhaust gas flow 30. One important advantage of using the super-elastic 60 as the alloy layer 50 is that it is extremely corrosion resistant and ideally suited for the harsh environment experienced adjacent the exhaust gas flow 30. Also of significant importance is that it can accommodate the large amounts of strain required of the deformed shape. The super-elastic alloy layer 50 performs the biasing function of the metal layer 28 described in connection with FIGS. 3–5 to gradually return the shape-memory alloy layer 46 to the position shown in solid lines in FIG. 7 when the conductor 54 is not providing heat to the shape-memory alloy layer 46.

Referring now to FIGS. 8 and 9, a flow altering component 60 in accordance with another alternative preferred embodiment of the present invention is shown. The flow altering component 60 also comprises a composite layer 62 which is secured to a shape-memory alloy layer 64 by a plurality of removable, double countersunk ASP fasteners 66. Also secured to the composite layer 62 is a strake 68 which is secured via suitable fasteners 70 (or possibly via an adhesive) to the composite layer 62. In this embodiment the shape-memory alloy layer 64 is "trained" during manufacture to assume one position when it is heated, indicated by the dashed lines in FIG. 9, and a second position when it is not being heated, indicated in solid lines in FIG. 9. The strake 68 acts as a stop to limit return or retracting movement of the shape-memory alloy layer 64 as it cools down from a heated condition.

The preferred embodiments described herein thus provide a deployable flow altering component which allows a desired degree of noise attenuation to be provided upon takeoff of an aircraft, while also allowing unobstructed or accelerating exhaust gas flow from a secondary exhaust gas nozzle when the aircraft is operating at a cruise altitude. The preferred embodiments of the invention do not add significant weight to the engine nacelle nor do they unnecessarily complicate the construction of the nacelle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for reducing noise from an exhaust nozzle associated with a jet engine, comprising:

a plurality of exhaust flow altering components spaced apart from one another and extending from a lip of said exhaust nozzle adjacent a flow path of an exhaust flow emitted from said exhaust nozzle; and each of said exhaust flow altering components being deformable from a first position adjacent to said flow path to a second position extending into said flow path of said exhaust flow in response to a control signal applied thereto, to thereby promote at least one of mixing of said exhaust flow with an adjacent airflow and attenuation of noise generated by said jet engine.

2. The system of claim 1, wherein said control signal comprises said exhaust flow; and wherein each of said flow altering components includes a heat sensitive layer of prestressed, shape-memory material.

3. The system of claim 2, wherein said heat sensitive layer of prestressed, shape-memory material comprises an alloy of nickel and titanium.

4. The system of claim 3, wherein said flow altering component further comprises a layer of metal secured to said alloy of nickel and titanium.

5. The system of claim 2, wherein said flow altering component further comprises a layer of a composite secured to said alloy of nickel and titanium.

6. The system of claim 2, wherein said nickel-titanium alloy comprises NITINOL® shape-memory nickel-titanium alloy.

7. The exhaust nozzle of claim 6, wherein said nickel-titanium alloy layer is bonded to said metal layer.

8. The system of claim 1, wherein each of said flow altering components comprise a triangular shape.

9. The system of claim 1, wherein said flow altering component comprises a super elastic layer of nickel-titanium alloy secured to said shape memory alloy.

10. The system of claim 1, wherein said flow altering component includes a conductor for supplying electrical current to said flow altering component to heat said flow altering component.

11. An exhaust nozzle for a jet engine for reducing noise emitted from said jet engine, said exhaust nozzle comprising:

a circumferential lip portion;

a plurality of deformable flow altering components extending from said lip portion and spaced apart from one another circumferentially about said lip portion; and each of said flow altering components being movable relative to said lip portion from a first position extending generally parallel to an exhaust flow path of an exhaust gas flow generated by said jet engine, to a second position protruding into said exhaust flow path in response to experiencing a control signal, to thereby promote mixing of said exhaust gas flow with a separate flow stream and attenuation of noise created by said exhaust gas flow.

12. The exhaust flow nozzle of claim 11, wherein said control signal comprises heat generated from said exhaust gas flow; and wherein said flow altering components each comprise a layer of nickel-titanium alloy operable to change a shape of said flow altering components in response to experiencing said heat from said exhaust gas flow.

13. The exhaust nozzle of claim 11, wherein said flow altering components each comprise a triangular shape.

14. The exhaust nozzle of claim 11, wherein said flow altering components each comprise a nickel-titanium alloy layer secured to a metal layer.

15. The exhaust nozzle of claim 14, wherein said metal layer comprises aluminum.

16. The exhaust nozzle of claim 11, wherein said flow altering components each comprise a nickel-titanium alloy layer secured to a super elastic layer of nickel-titanium.

17. The exhaust nozzle of claim 11, wherein said flow altering components each comprise a layer of NITINOL® shape-memory nickel-titanium alloy.

18. The exhaust nozzle of claim 11, wherein said flow altering components each comprise a conductor for enabling said flow altering components to be heated via an electrical current.

19. A method for attenuating noise from a jet engine, comprising:

disposing an exhaust nozzle adjacent said jet engine;

coupling a plurality of tab-like flow altering components to a portion of said exhaust nozzle such that said tab-like flow altering components extend generally adjacent an exhaust gas flow generated by said jet engine; and controllably deforming said flow altering components such that said components project into said exhaust gas flow to thereby promote mixing of said exhaust gas flow with an adjacent airflow to thus reduce noise generated by said jet engine.

* * * * *